United States Patent
Xiong et al.

(10) Patent No.: US 12,482,198 B2
(45) Date of Patent: Nov. 25, 2025

(54) REAL-TIME PHOTOREALISTIC VIEW RENDERING ON AUGMENTED REALITY (AR) DEVICE

(71) Applicant: Samsung Electronics Co., Ltd., Suwon-si (KR)

(72) Inventors: Yingen Xiong, Mountain View, CA (US); Christopher A. Peri, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 205 days.

(21) Appl. No.: 18/353,579

(22) Filed: Jul. 17, 2023

(65) Prior Publication Data

US 2024/0046583 A1    Feb. 8, 2024

Related U.S. Application Data

(60) Provisional application No. 63/396,128, filed on Aug. 8, 2022.

(51) Int. Cl.
G06T 19/00    (2011.01)
G06T 7/593    (2017.01)
G06T 7/73     (2017.01)

(52) U.S. Cl.
CPC ............ *G06T 19/006* (2013.01); *G06T 7/593* (2017.01); *G06T 7/73* (2017.01);
(Continued)

(58) Field of Classification Search
None
See application file for complete search history.

(56) References Cited

U.S. PATENT DOCUMENTS 11,238,604 B1 *  2/2022  Baig ...................... G06N 20/00
11,900,547 B2 *  2/2024  Gomez Gonzalez ........................
                                                        G06F 16/338
(Continued)

FOREIGN PATENT DOCUMENTS

CN    112613609 A    4/2021
CN    113538659 A    10/2021
(Continued)

OTHER PUBLICATIONS

Garbin, Stephan J., et al. "Fastnerf: High-fidelity neural rendering at 200fps." Proceedings of the IEEE/CVF international conference on computer vision. 2021. (Year: 2021).*

(Continued)

*Primary Examiner* — Ryan M Gray

(57) ABSTRACT

A method includes obtaining images of a scene and corresponding position data of a device that captures the images. The method also includes determining position data and direction data associated with camera rays passing through keyframes of the images. The method further includes using a position-dependent multilayer perceptron (MLP) and a direction-dependent MLP to create sparse feature vectors. The method also includes storing the sparse feature vectors in at least one data structure. The method further includes receiving a request to render the scene on an augmented reality (AR) device associated with a viewing direction. In addition, the method includes rendering the scene associated with the viewing direction using the sparse feature vectors in the at least one data structure.

20 Claims, 12 Drawing Sheets

(52) U.S. Cl.
CPC ............... *G06T 2207/10021* (2013.01); *G06T 2207/20224* (2013.01); *G06T 2207/30244* (2013.01)

(56) References Cited

U.S. PATENT DOCUMENTS

| | | | | |
|---|---|---|---|---|
| 12,046,002 | B1* | 7/2024 | Nie | G06T 7/73 |
| 12,100,108 | B2* | 9/2024 | Shahrokni | G06T 3/40 |
| 12,231,615 | B2* | 2/2025 | Xiao | H04N 13/122 |
| 2021/0043008 | A1 | 2/2021 | Nourai et al. | |
| 2021/0352262 | A1* | 11/2021 | Buslaev | G06T 7/80 |
| 2022/0189104 | A1* | 6/2022 | Wetzstein | G06N 3/08 |
| 2023/0306675 | A1* | 9/2023 | Huang | G06T 7/97 |
| 2023/0419616 | A1* | 12/2023 | Dudovitch | H04L 51/10 |
| 2024/0005617 | A1* | 1/2024 | Shakhrai | G06T 11/001 |
| 2024/0046516 | A1* | 2/2024 | Anciukevicius | G06T 7/75 |

FOREIGN PATENT DOCUMENTS

| | | |
|---|---|---|
| CN | 113688907 A | 11/2021 |
| CN | 113706714 A | 11/2021 |
| CN | 114119838 A | 3/2022 |

OTHER PUBLICATIONS

Liu, Lingjie, et al. "Neural sparse voxel fields." Advances in Neural Information Processing Systems 33 (2020): 15651-15663. (Year: 2020).*

Campos, Carlos, et al. "Orb-slam3: An accurate open-source library for visual, visual-inertial, and multimap slam." IEEE transactions on robotics 37.6 (2021): 1874-1890. (Year: 2021).*

Verbin, Dor, et al. "Ref-nerf: Structured view-dependent appearance for neural radiance fields." 2022 IEEE/CVF Conference on Computer Vision and Pattern Recognition (CVPR). IEEE, 2022. (Year: 2022).*

Zhang, Kai, et al. "Nerf++: Analyzing and improving neural radiance fields." arXiv preprint arXiv:2010.07492 (2020). (Year: 2020).*

Mildenhall, Ben, et al. "Nerf: Representing scenes as neural radiance fields for view synthesis." Communications of the ACM 65.1 (2021): 99-106. (Year: 2021).*

* cited by examiner

REAL-TIME PHOTOREALISTIC VIEW RENDERING ON AUGMENTED REALITY (AR) DEVICE

CROSS-REFERENCE TO RELATED APPLICATION AND PRIORITY CLAIM

This application claims priority under 35 U.S.C. § 119(e) to U.S. Provisional Patent Application No. 63/396,128 filed on Aug. 8, 2022, which is hereby incorporated by reference in its entirety.

TECHNICAL FIELD

This disclosure relates generally to imaging devices and processes. More specifically, this disclosure relates to real-time photorealistic view rendering on an augmented reality (AR) device.

BACKGROUND

View synthesis uses images of a scene to generate a three-dimensional (3D) scene representation, which can be used to render the scene from novel unobserved viewpoints. Neural radiance field (NeRF) view synthesis can generate neural volumetric representations from images based on machine learning in order to represent 3D scenes, where the neural volumetric representations can be used for rendering photorealistic images from novel viewpoints. Compared to traditional volume-based representations, such as those generated using truncated signed distance functions (TSDFs), NeRF view synthesis can render finer geometric details and view-dependent appearances.

SUMMARY

This disclosure relates to real-time photorealistic view rendering on an augmented reality (AR) device.

In a first embodiment, a method includes obtaining images of a scene and corresponding position data of a device that captures the images. The method also includes determining position data and direction data associated with camera rays passing through keyframes of the images. The method further includes using a position-dependent multi-layer perceptron (MLP) and a direction-dependent MLP to create sparse feature vectors. The method also includes storing the sparse feature vectors in at least one data structure. The method further includes receiving a request to render the scene on an AR device associated with a viewing direction. In addition, the method includes rendering the scene associated with the viewing direction using the sparse feature vectors in the at least one data structure.

In a second embodiment, an electronic device includes at least one processing device configured to obtain images of a scene and corresponding position data of a device that captures the images. The at least one processing device is also configured to determine position data and direction data associated with camera rays passing through keyframes of the images. The at least one processing device is further configured to use a position-dependent MLP and a direction-dependent MLP to create sparse feature vectors. The at least one processing device is also configured to store the sparse feature vectors in at least one data structure. The at least one processing device is further configured to receive a request to render the scene on an AR device associated with a viewing direction. In addition, the at least one processing device is configured to render the scene associated with the viewing direction using the sparse feature vectors in the at least one data structure.

In a third embodiment, a non-transitory machine readable medium contains instructions that when executed cause at least one processor of an electronic device to obtain images of a scene and corresponding position data of a device that captures the images. The non-transitory machine readable medium also contains instructions that when executed cause the at least one processor to determine position data and direction data associated with camera rays passing through keyframes of the images. The non-transitory machine readable medium further contains instructions that when executed cause the at least one processor to use a position-dependent MLP and a direction-dependent MLP to create sparse feature vectors. The non-transitory machine readable medium also contains instructions that when executed cause the at least one processor to store the sparse feature vectors in at least one data structure. The non-transitory machine readable medium further contains instructions that when executed cause the at least one processor to receive a request to render the scene on an AR device associated with a viewing direction. In addition, the non-transitory machine readable medium contains instructions that when executed cause the at least one processor to render the scene associated with the viewing direction using the sparse feature vectors in the at least one data structure.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module,"

"device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, described below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, view synthesis uses images of a scene to generate a three-dimensional (3D) scene representation, which can be used to render the scene from novel unobserved viewpoints. Neural radiance field (NeRF) view synthesis can generate neural volumetric representations from images based on machine learning in order to represent 3D scenes, where the neural volumetric representations can be used for rendering photorealistic images from novel viewpoints. Compared to traditional volume-based representations, such as those generated using truncated signed distance functions (TSDFs), NeRF view synthesis can render finer geometric details and view-dependent appearances.

Previous attempts using NeRF view synthesis have experienced slow rendering procedures and are difficult to use in real-time applications given the high computational and memory requirements. Compared to traditional volume-based 3D scene reconstruction, NeRF-based 3D view synthesis generally has higher requirements for camera poses and depths. Prior to performing NeRF-based real-time photorealistic view rendering, it can be useful or important to generate high-accuracy, six degrees of freedom (DoF) camera poses and high-quality depth maps.

This disclosure describes techniques for performing real-time photorealistic view rendering on an AR device. As described in more detail below, images of a scene and corresponding position data of a device that captures the images are obtained, and position data and direction data associated with camera rays passing through keyframes of the images are determined. A position-dependent multilayer perceptron (MLP) and a direction-dependent MLP are used to create sparse feature vectors, and the sparse feature vectors are stored in at least one data structure. A request to render the scene on an AR device associated with a viewing direction is received, and the scene associated with the viewing direction is rendered using the sparse feature vectors in the at least one data structure.

In this way, these techniques can be used to realize real-time view synthesis applications by precomputing and storing sparse feature vectors. Moreover, a light-weight MLP can be used to produce novel views, which can simplify the generation of the novel views and reduce computational and memory requirements. In addition, a cache structure can be designed for efficient querying in parallel while maintaining efficient memory usage.

Figure 1:
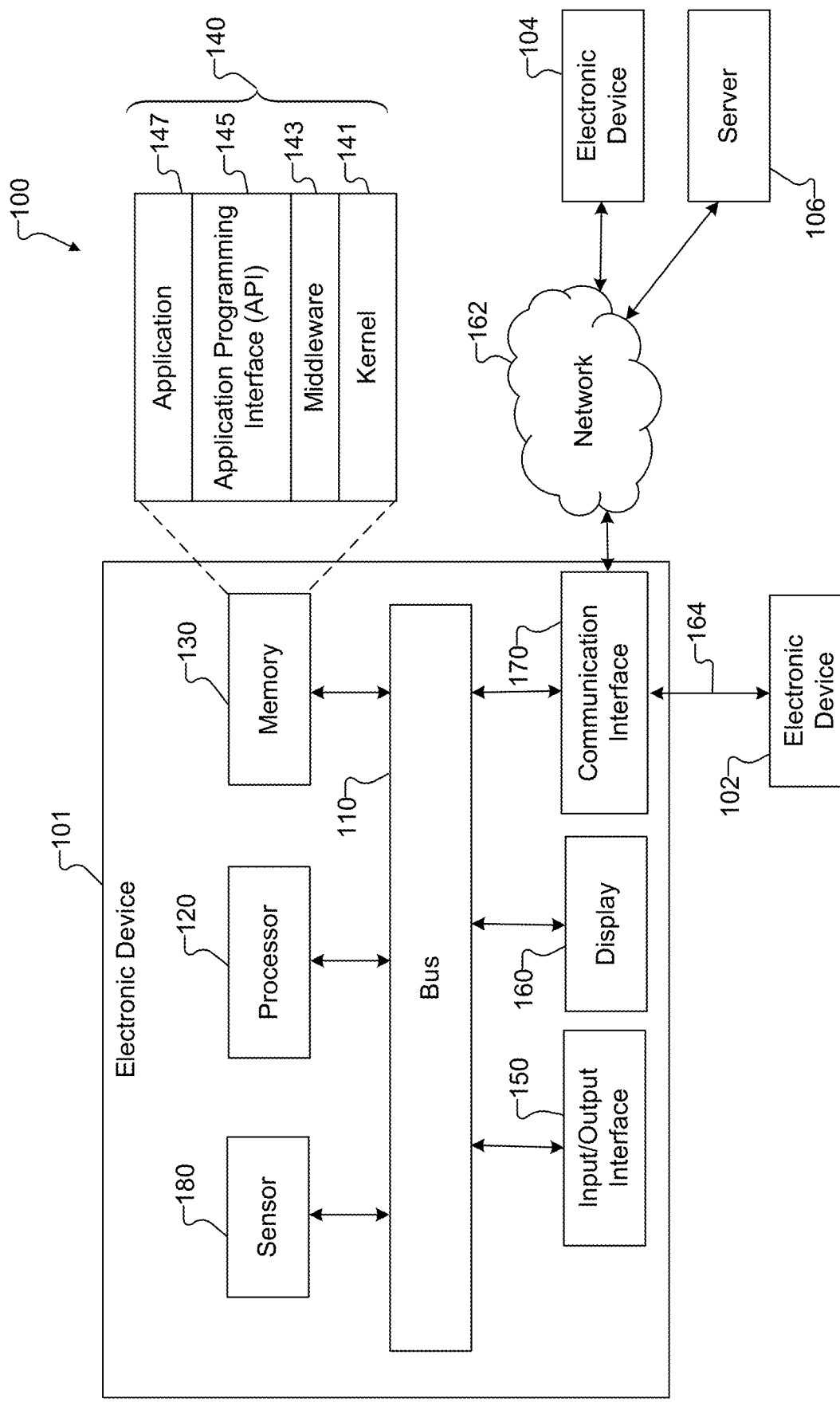
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, and a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may perform real-time photorealistic view rendering as described in more detail below.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, perform real-time photorealistic view rendering. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, the sensor(s) 180 can include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the electronic device 101 can be a wearable device or an electronic device-mountable wearable device (such as an HMD). For example, the electronic device 101 may represent an AR wearable device, such as a headset or smart eyeglasses. In other embodiments, the first external electronic device 102 or the second external electronic device 104 can be a wearable device or an electronic device-mountable wearable device (such as an HMD). In those other embodiments, when the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments of this disclosure, the server 106 may perform real-time photorealistic view rendering on an AR device as described in more detail below.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

FIGS. 2A through 2D illustrate an example process 200 for real-time photorealistic view rendering on an AR device in accordance with this disclosure. For ease of explanation, the process 200 may be described as being implemented using the electronic device 101 in the network configuration 100 of FIG. 1. However, the process 200 may be used in any other suitable device(s) and in any other suitable system(s).

As shown in FIGS. 2A through 2D, the process 200 generally includes image, depth, and pose acquisition and computation operations 202 and NeRF training, storing, testing, and rendering operations 204. In this example, the process 200 can utilize a sensor module 206, as well as modules 208-214 to perform the image, depth, and pose acquisition operations 202 and modules 216-220 to perform the NeRF training, storing, testing, and rendering operations 204. The image, depth, and pose acquisition operations 202 generally includes a data capture module 208, a camera pose module 210, a depth reconstruction module 212, and a data integration module 214. The NeRF training, storing, testing, and rendering operations 204 generally includes a NeRF module 216, a feature module 218, and a novel view rendering module 220.

Figure 2A:
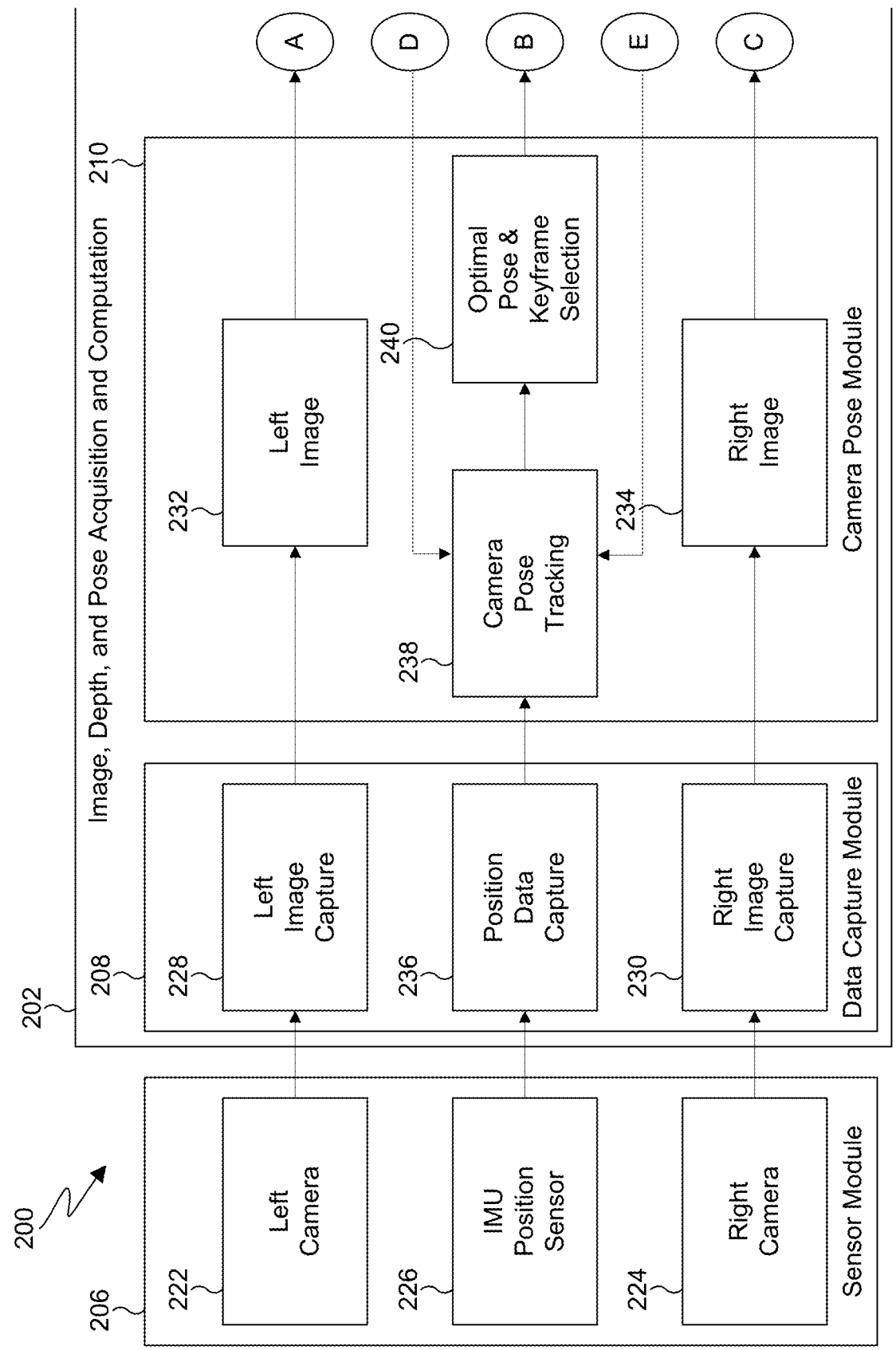
FIGS. 2A through 2D illustrate an example process for real-time photorealistic view rendering on an augmented reality (AR) device in accordance with this disclosure.

As shown in FIG. 2A, the electronic device 101 includes the sensor module 206, which in this example includes first and second cameras 222 and 224. For example, the electronic device 101 may include one or more sensors 180 that implement the cameras 222 and 224. In some embodiments, the cameras 222 and 224 can be arranged as left and right cameras. The sensor module 206 also includes an inertial measurement unit (IMU) position sensor 226. For instance, the electronic device 101 may include another sensor 180 that implements the IMU position sensor 226.

The data capture module 208 is used to perform first and second image capture operations 228 and 230 and a position data capture operation 236. For example, the first and second image capture operations 228 and 230 may be used to generate first and second images 232 and 234 using image data produced by the cameras 222 and 224. In some embodiments, the first and second images 232 and 234 can be left and right image captures from left and right cameras. The position data capture operation 236 may be used to generate position data related to the first and second images 232 and 234 based on data from the IMU position sensor 226. For instance, the position data can identify a position and an orientation of the electronic device 101 when the first and second images 232 and 234 are captured. In some embodiments, the position and orientation of the cameras 222 and 224 can be fixed in relation to the IMU position sensor 226.

The camera pose module 210 can perform a camera pose tracking operation 238 using the first and second images 232 and 234 and the captured position data. The camera pose tracking operation 238 can be used to identify and track the pose of the electronic device 101 over time, such as by tracking the orientation of the electronic device 101 over time. The camera pose tracking operation 238 can also be used to re-localize the electronic device 101, which can involve identifying where the electronic device 101 is being pointed within a given space based on the current orientation of the electronic device 101. The camera pose tracking operation 238 can further be used for mapping, which can involve identifying a point cloud or other 3D mapping of the space around the electronic device 101. In some embodiments, the camera pose tracking operation 238 can be performed using simultaneous localization and mapping (SLAM). Also, in some embodiments, the camera pose tracking operation 238 can be performed to obtain six DoF poses and sparse 3D points from sparse reconstruction.

The camera pose module 210 can also perform an optimal pose and keyframe selection operation 240 using the pose of the electronic device 101 or a pose of the cameras 222 and 224. The optimal pose and keyframe selection operation 240 uses the first and second images 232 and 234 and the camera pose determined using the pose-tracking operation 238. For example, a feature map for each of the first and second images 232 and 234 can be generated using features extracted by a convoluted neural network (CNN). Feature mapping can be performed on the feature maps for the first and second images 232 and 234 to define keyframes that best represent a 3D structure of a captured scene, and an initial 3D structure for the scene can be created with an initial camera pose and keyframes. A global bundle adjustment can be performed to obtain optimal keyframes and optimized camera poses for the optimal keyframes. For example, processing all frames of a camera capturing 75 frames per second may be very slow. Because the 75 frames might not have significant changes within the one second time period, a set of frames can be selected for processing and to represent the 75 frames. The selected frames in the set can be referred to as keyframes.

Figure 2B:
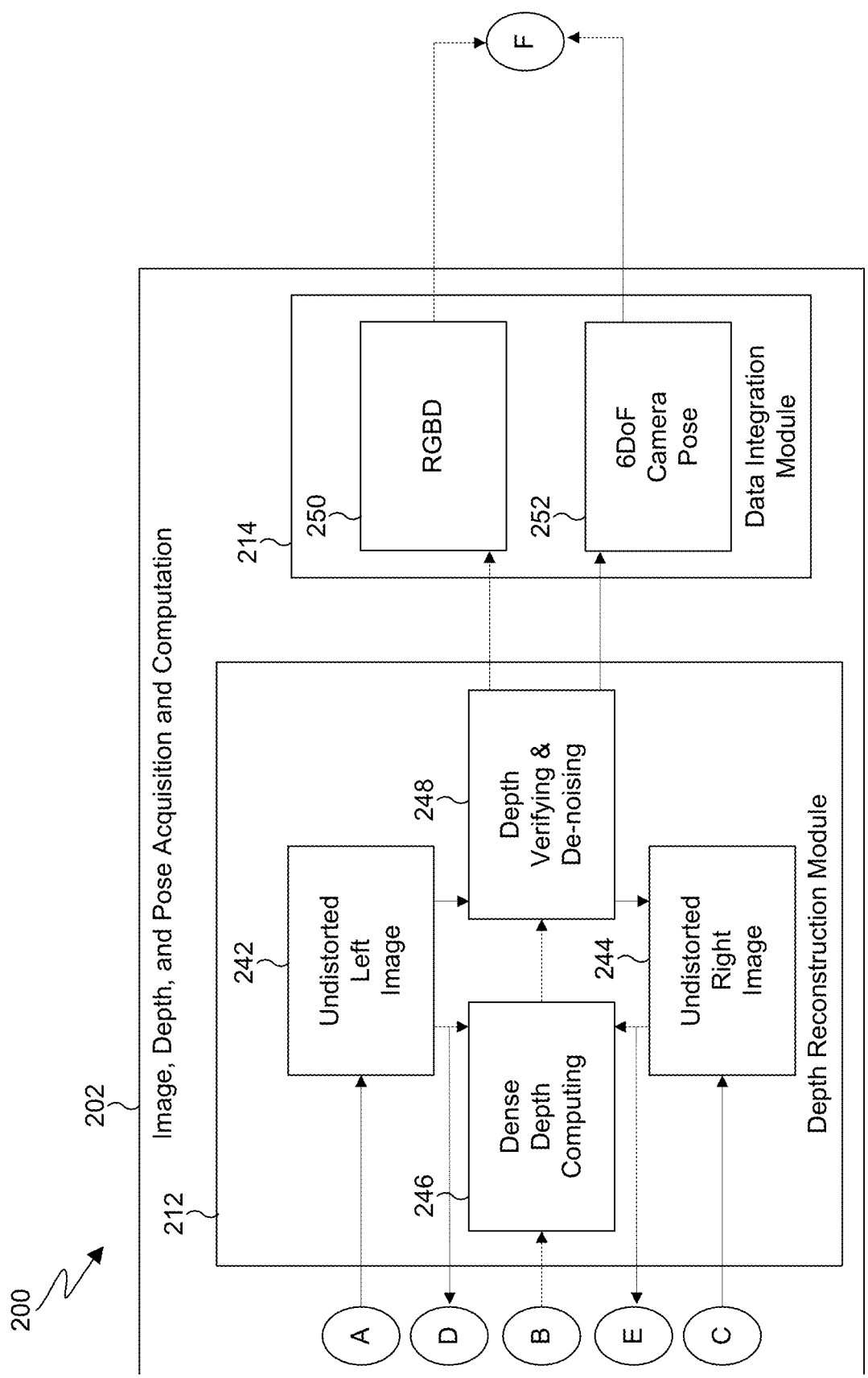

As shown in FIG. 2B, the depth reconstruction module 212 can perform camera calibration operations to determine intrinsic and extrinsic parameters of the cameras 222 and 224. The intrinsic and extrinsic parameters can be used with the first and second images 232 and 234 to respectively generate first and second undistorted images 242 and 244. The camera calibration operations can use any suitable technique to identify intrinsic and extrinsic parameters of the cameras 222 and 224. The undistorted image 242 and 244 can be generated by un-distorting and rectifying the first and second images 232 and 234. This can be done, for instance, in order to subsequently blend virtual objects into the real-world scene. The undistorted images 242 and 244 can be generated using any suitable techniques to un-distort and rectify multiple images. For instance, the undistorted images 242 and 244 may be generated using the intrinsic and extrinsic parameters of the cameras 222 and 224 to un-distort and rectify the first and second images 232 and 234.

A dense depth computing operation 246 can be performed to generate first and second dense depth maps for the first and second images 232 and 234. In some embodiments, the dense depth computing operation 246 is performed only for the selected keyframes. For example, a dense depth map can be generated by fusing or combining a sparse depth map and the associated captured image. In some cases, the dense depth computing operation 246 can receive a current frame and output depth information corresponding to pixel points in the frame. Ideally, the dense depth computing operation 246 can determine a significant amount of points of depth data for an image. The dense depth maps can be used for various functions, such as supporting occlusion between virtual objects and a real-word scene, depth matching between perceptual depths and real-world scene depths, and depth re-projection in viewpoint transformations.

A depth verifying and de-noising operation 248 can reconstruct depths from stereo image pairs. For example, to perform depth verification, relationships of a triangulation for first and second keyframes from the first and second cameras 222 and 224 can be compared to a 3D point. Noise in the depth data may result in inaccurate rendering of objects. A reconstructed 3D point is considered correct if the relationships are satisfied for the 3D point. When the relationships are not satisfied for a 3D point, a wrong depth or noise may have been introduced, and the wrong depth may be filtered or otherwise modified to reduce or prevent the wrong depth from affecting subsequent operations.

The data integration module 214 can support the use of red, green, blue, and depth (RGBD) data 250 and six DoF camera pose data 252. In some embodiments, the RGBD data 250 and the six DoF camera pose data 252 are determined and stored only for the selected keyframes. The RGBD data 250 can be determined after the depth verifying and de-noising operation 248, and the RGBD data 250 can be stored as a frame with the color and depth information for each pixel. The six DoF camera pose data 252 can indicate the relative position and rotation of the electronic device 101 or the first and second cameras 222 and 224. As a particular example, when the electronic device 101 is an AR headset, the six DoF camera pose data 252 may correspond to a head pose of the user.

Figure 2C:
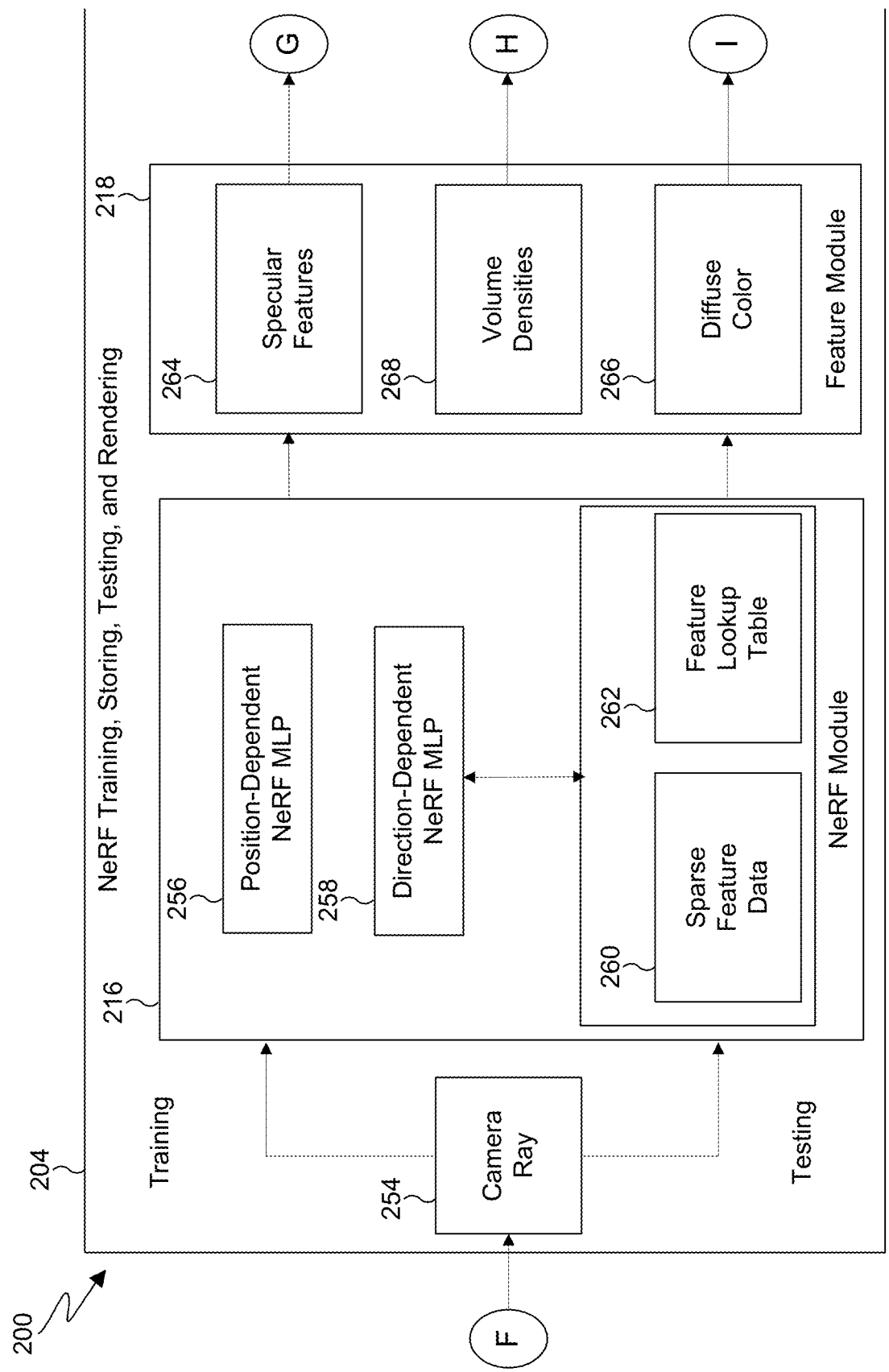

As shown in FIG. 2C, camera rays 254 can be created with the RGBD data 250 and the six DoF camera pose data 252. A camera ray 254 can be defined as a point and a direction vector, where the ray originates at the point and moves in a direction of the direction vector. Each pixel in an image can be defined as a camera ray 254.

The NeRF module 216 can include a position-dependent NeRF MLP 256 and a direction-dependent NeRF MLP 258 for training. An MLP is a feedforward artificial neural network (ANN). The position-dependent NeRF MLP 256 and the direction-dependent NeRF MLP 258 can be trained to identify a 3D structure in the scene captured by the first and second cameras 222 and 224. The position-dependent NeRF MLP 256 uses the positions of the camera rays 254 to generate a deep radiance map and a density, and the direction-dependent NeRF MLP 258 uses the directions of the camera rays 254 to generate a weight 205. The position-dependent NeRF MLP 256 and the direction-dependent NeRF MLP 258 represent one or more machine learning models trained to learn relationships between camera pose, image color, and density of a 3D scene reconstruction.

The NeRF module 216 can also include data structures for a sparse feature data structure 260 and a feature lookup table 262. The 3D scene reconstruction can be represented by feature vectors or sparse feature data in the sparse feature data structure 260. For example, the 3D scene reconstruction can be stored in a sparse grid of feature vectors in an octree data structure. As a particular example, a scene with a few features, such as walls of a room without furniture, can be described with little information, such as where a wall can be defined based on a normal and an original position. When furniture is included in the room, details for the furniture can also be stored in the sparse feature data structure 260. A feature lookup table 262 can be generated to quickly identify the details for the features in the sparse feature data structure 260.

The feature module 218 can support the use of specular features 264, volume densities 268, and diffuse colors 266. The specular features 264, volume densities 268, and diffuse colors 266 can be identified by the sparse feature data in the sparse feature data structure 260, such as by using the machine learning functions of the NeRF module 216. The specular features 264 are related to a reflection of a light source, the volume densities 268 correspond to grayscale values of pixels, and the diffuse colors 266 can be vectors that define colors of pixels under diffuse lighting.

Figure 2D:
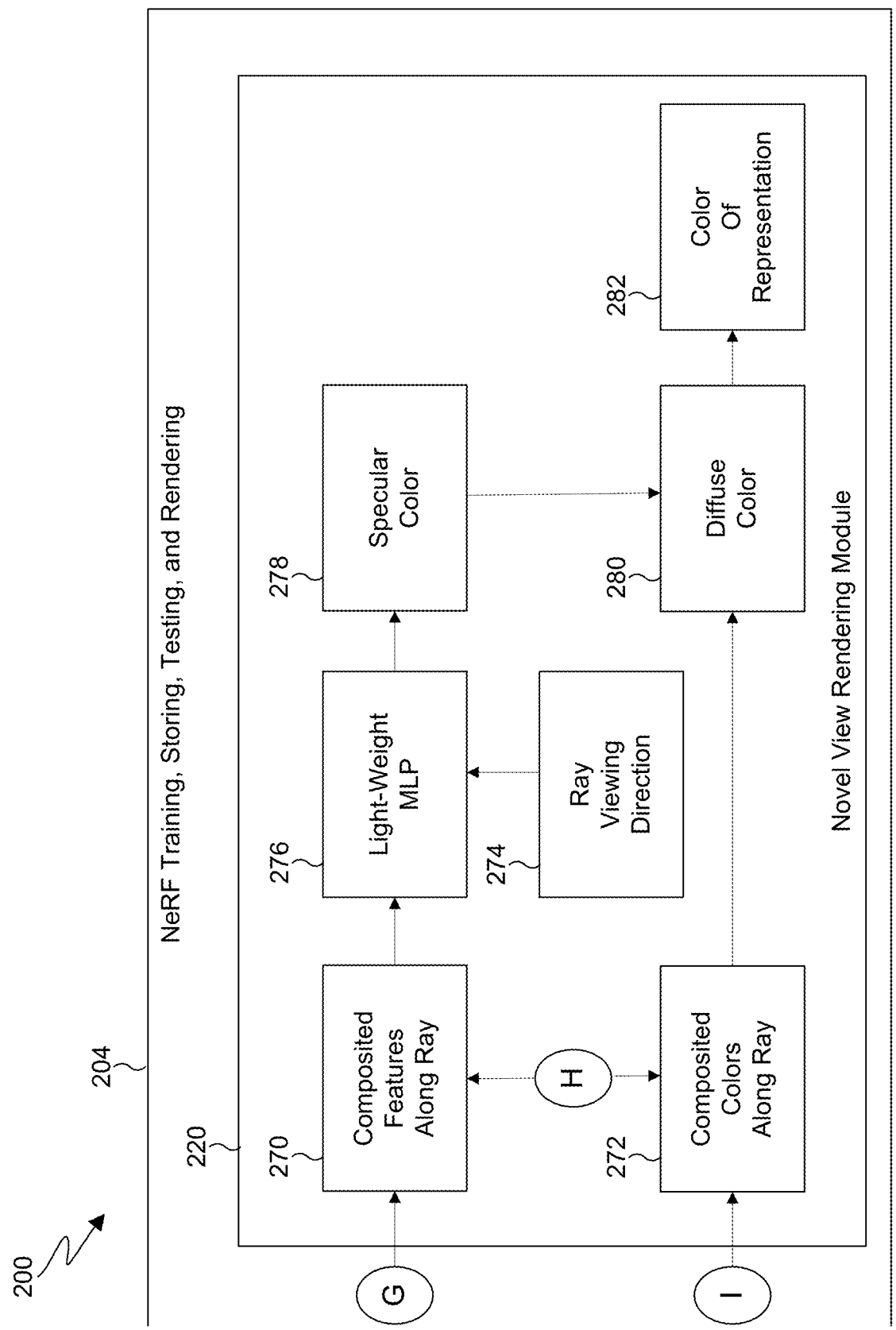

As shown in FIG. 2D, the novel view rendering module 220 can perform a feature compositing operation 270 and a color compositing operation 272. The feature compositing operation 270 uses the specular features 264 and the volume densities 268 to determine alpha-composite features along the camera rays 254. The color compositing operation 272 uses the diffuse colors 266 and the volume densities 268 to determine alpha-composite colors along the camera rays 254. The novel view rendering module 220 can perform a ray viewing direction operation 274 to determine a specific viewpoint of the scene. The viewpoint, alpha-composite features, and volume densities are input to a light-weight MLP 276 to produce specular colors 278. Diffuse colors 280 can be determined based on the ray viewing direction and the alpha-composite colors along the camera rays 254. The diffuse colors 280 and the specular colors 278 are combined to obtain representation colors 282, which can be rendered for display. The representation colors 282 represent the colors of pixels in a final rendering frame.

Although FIGS. 2A through 2D illustrate one example of a process 200 for real-time photorealistic view rendering on an AR device, various changes may be made to FIGS. 2A through 2D. For example, while shown as a series of operations, various operations in FIGS. 2A through 2D may overlap, occur in parallel, occur in a different order, or occur any number of times.

Figure 3:
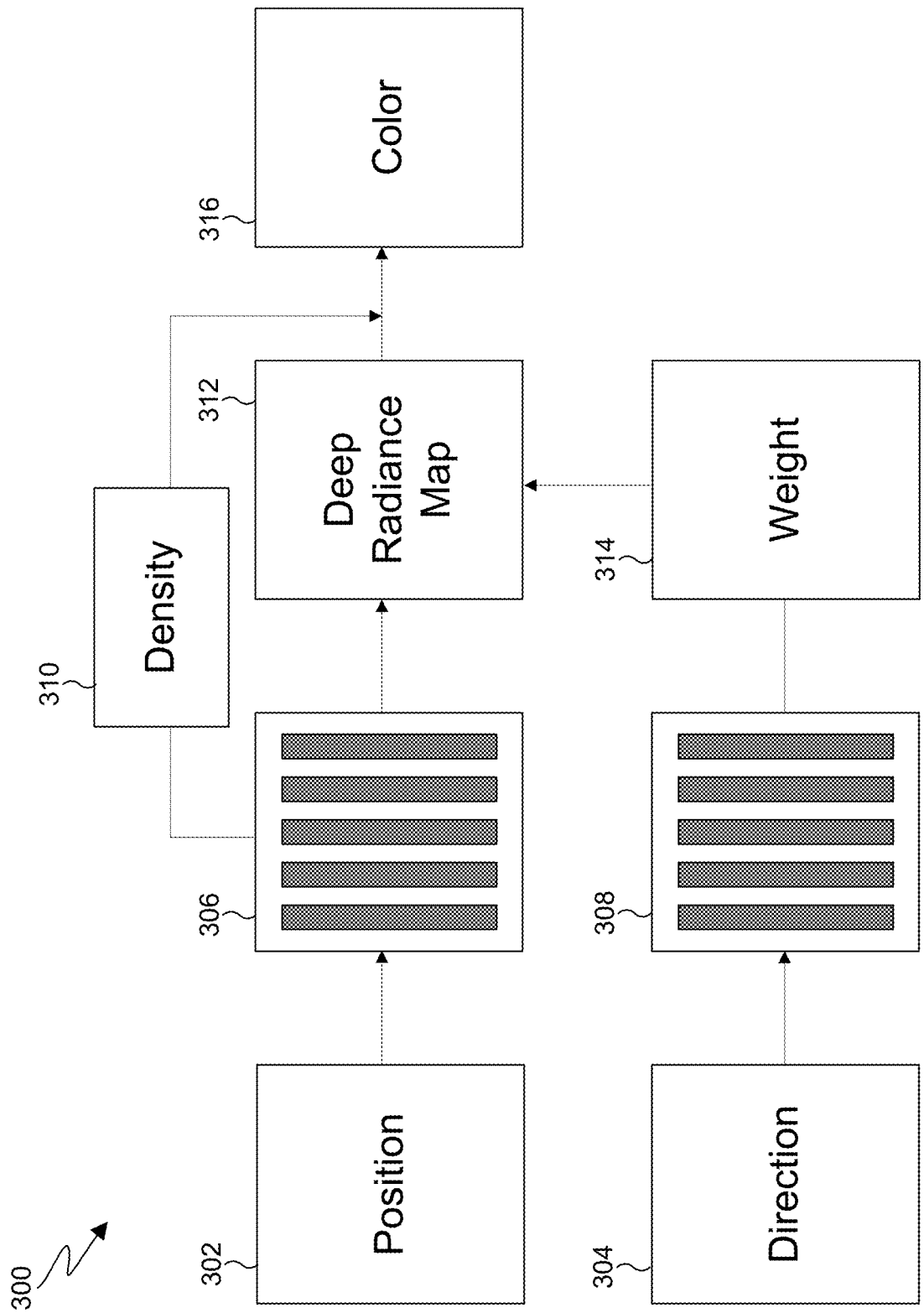
FIG. 3 illustrates an example pipeline with a position-dependent multilayer perceptron (MLP) and a direction-dependent MLP in accordance with this disclosure.

FIG. 3 illustrates an example pipeline 300 with a position-dependent MLP and a direction-dependent MLP in accordance with this disclosure. For ease of explanation, the pipeline 300 may be described as being implemented using the electronic device 101 in the network configuration 100 of FIG. 1. However, the pipeline 300 may be used in any other suitable device(s) and in any other suitable system(s).

As shown in FIG. 3, the pipeline 300 separates position 302 and direction 304 of a camera ray 254. The position 302 corresponds to an initial position of the camera ray 254 or a location of a feature point, and the direction 304 corresponds to a direction of travel for the camera ray 254. The pipeline 300 further includes a position-dependent MLP 306 and a direction-dependent MLP 308, which can respectively correspond to the position-dependent NeRF MLP 256 and the direction-dependent NeRF MLP 258 shown in FIG. 2C. The position-dependent MLP 306 uses the position 302 to output a density 310 and a deep radiance map 312. The deep radiance map 312 defines how the position-dependent MLP 306 expresses the 3D scene. The direction-dependent MLP 308 uses the direction 304 to output a weight 314. The weight 314 is used to determine an amount of information used from the deep radiance map 312 for each image where a feature point is visible. For example, a direct view of a feature point can have a greater weight than a side view of the same feature point. The deep radiance map 312 can be stored in a sparse feature vector grid, such as in the sparse feature data structure 260, after network training and can be cached in a lookup table, such as in the feature lookup table 262. The lookup table can be queried based on camera rays to obtain composited colors and composited features. The pipeline 300 results in a color 316 along with the density 310.

Although FIG. 3 illustrates one example of a pipeline 300 with a position-dependent MLP and a direction dependent MLP, various changes may be made to FIG. 3. For example, while shown as a series of operations, various operations in FIG. 3 may overlap, occur in parallel, occur in a different order, or occur any number of times.

Figure 4:
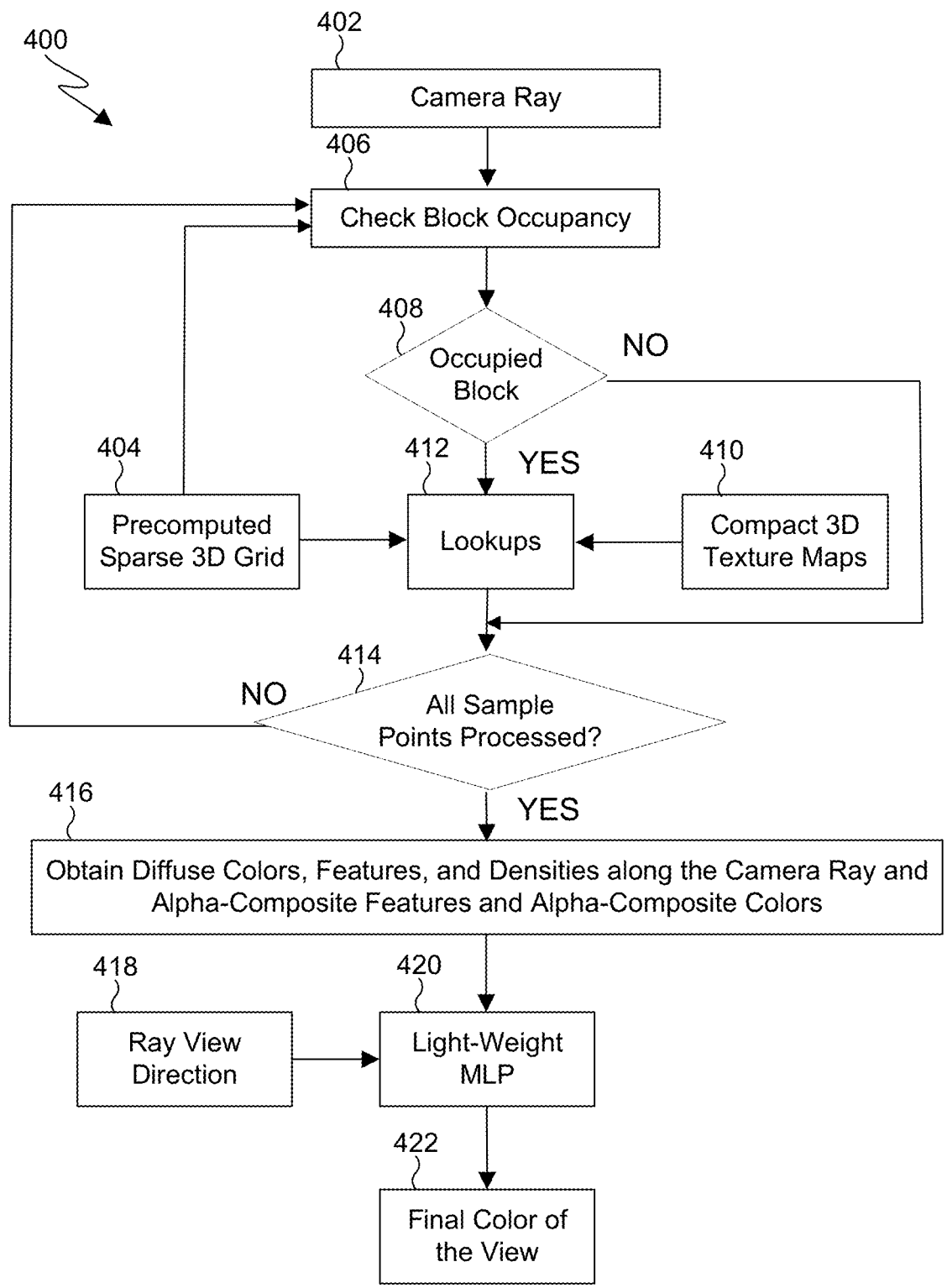
FIG. 4 illustrates an example process for view synthesis in accordance with this disclosure.

FIG. 4 illustrates an example process 400 for view synthesis in accordance with this disclosure. For ease of explanation, the process 400 may be described as being implemented using the electronic device 101 in the network configuration 100 of FIG. 1. However, the process 400 may be used in any other suitable device(s) and in any other suitable system(s).

As shown in FIG. 4, the electronic device 101 selects a camera ray 254 at a feature point in operation 402. In some cases, the camera ray 254 can be created with the RGBD data 250 and the six DoF camera pose data 252. A camera ray 254 can be defined as a pair including a point and a direction vector, where the ray originates at the point and moves in a direction of the direction vector. Each pixel in an image can have a color defined by a camera ray 254. The electronic device 101 can receive a sparse 3D grid in operation 404. In some cases, the sparse 3D grid can be determined prior to the rendering of the 3D scene and also prior to performing the process 400. The sparse 3D grid can correspond to the sparse feature data structure 260.

The electronic device 101 can identify a block occupancy in operation 406. For example, the position, depth, and direction of the camera ray 254 can be used to identify the block occupancy. Identifying the block occupancy can also include utilizing the precomputed sparse 3D grid. In some cases, the camera ray can be split into a finite amount of sample points in order to identify the block occupancy. The electronic device 101 determines whether the camera ray 254 hits an object in the scene in operation 408. A blocked object means that the model is empty, and operation 412 can be skipped for that sample point. When a part of a scene is known to be empty, the sample points can be skipped for the area of the scene. 3D compact texture maps can be generated in operation 410. The 3D compact texture maps can be stored in the sparse feature data structure 260 and cached in the feature lookup table 262. The 3D compact texture maps can correspond to the deep radiance maps 312. An unblocked object means that the model is occupied, and a location of the sample point from the precomputed sparse 3D grid can be mapped to a compact 3D texture map in operation 412. Once the sample point is mapped, the next sample point can be analyzed in operation 406. The electronic device 101 repeats operations 406, 408, and 412 until determining that all sample points have been processed in operation 414. If the scene is known to be empty along the camera ray, operations 406, 408, and 412 may be skipped.

The electronic device 101 obtains diffuse colors, features, and densities along the camera ray, alpha-composite features, and alpha-composite colors in operation 416. The diffuse colors, features, and densities along the camera ray can correspond to the specular features 264, the volume densities 268, and the diffuse colors 266. The specular features 264, the volume densities 268, and diffuse colors 266 can be identified by the sparse feature data in the sparse feature data structure 260, such as by using the machine learning of the NeRF module 216. The alpha-composite features can be generated by the feature compositing operation 270 using the specular features 264 and the volume densities 268. The alpha-composite colors can be generated by the color compositing operation 272 using the diffuse colors 266 and the volume densities 268 along the camera ray 254.

The electronic device 101 can determine a ray viewing direction in operation 418. In some cases, the ray viewing direction can be determined by performing the ray viewing direction operation 274 and the view viewing direction can correspond a viewpoint of the scene. The electronic device 101 can utilize a light-weight MLP in operation 420. The viewpoint, alpha-composite features, and volume densities are input to the light-weight MLP to produce a specular color. The electronic device 101 determine a final color of the view in operation 422. For example, the diffuse color and the specular color can be combined to obtain the final color of the view, and the final color can be rendered for display. The final color is a color of a pixel in a final rendering frame.

Although FIG. 4 illustrates one example of a process 400 for view synthesis, various changes may be made to FIG. 4. For example, while shown as a series of operations, various operations in FIG. 4 may overlap, occur in parallel, occur in a different order, or occur any number of times.

Figure 5A:
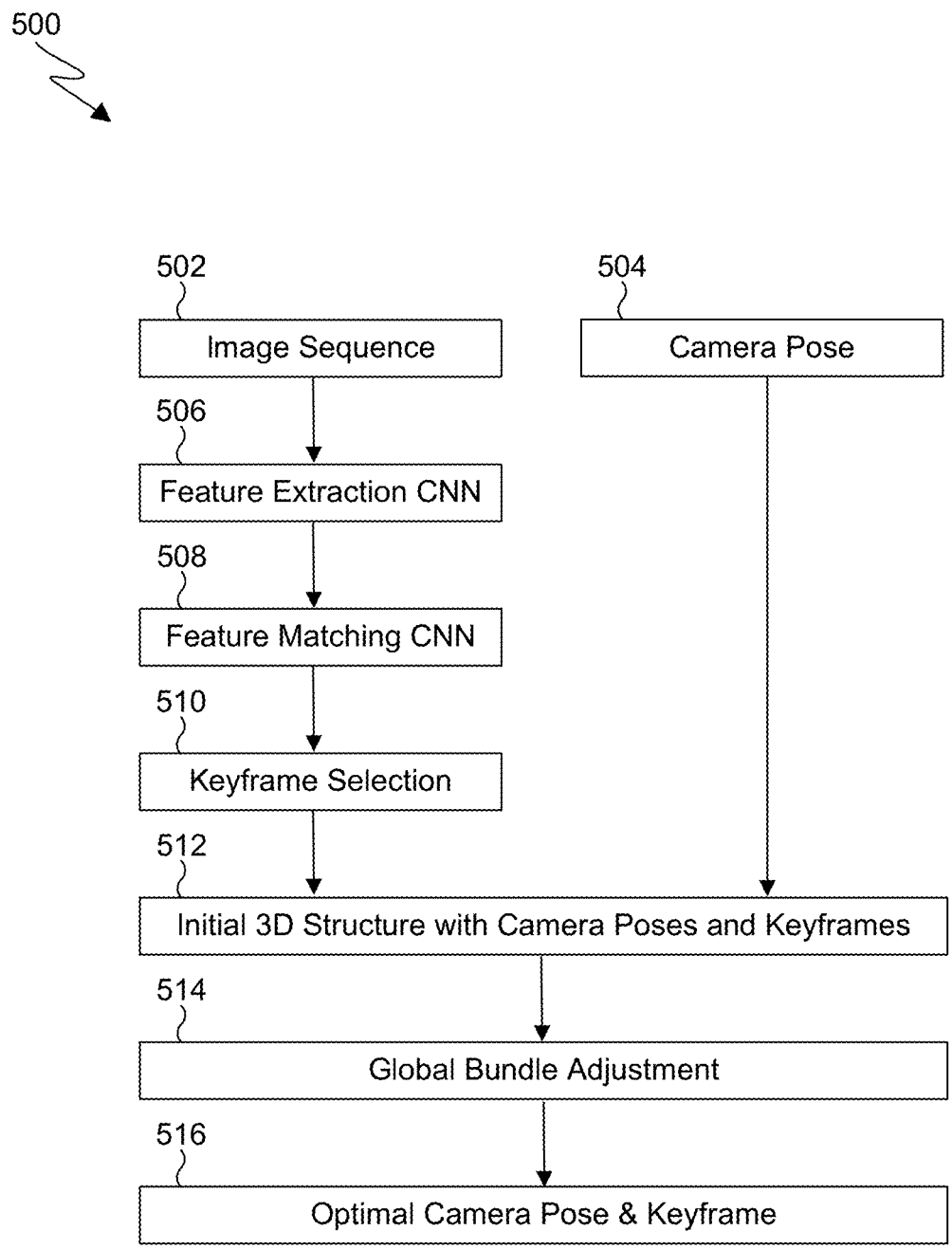
FIGS. 5A and 5B illustrate an example process for pose optimization and keyframe selection in accordance with this disclosure.
Figure 5B:
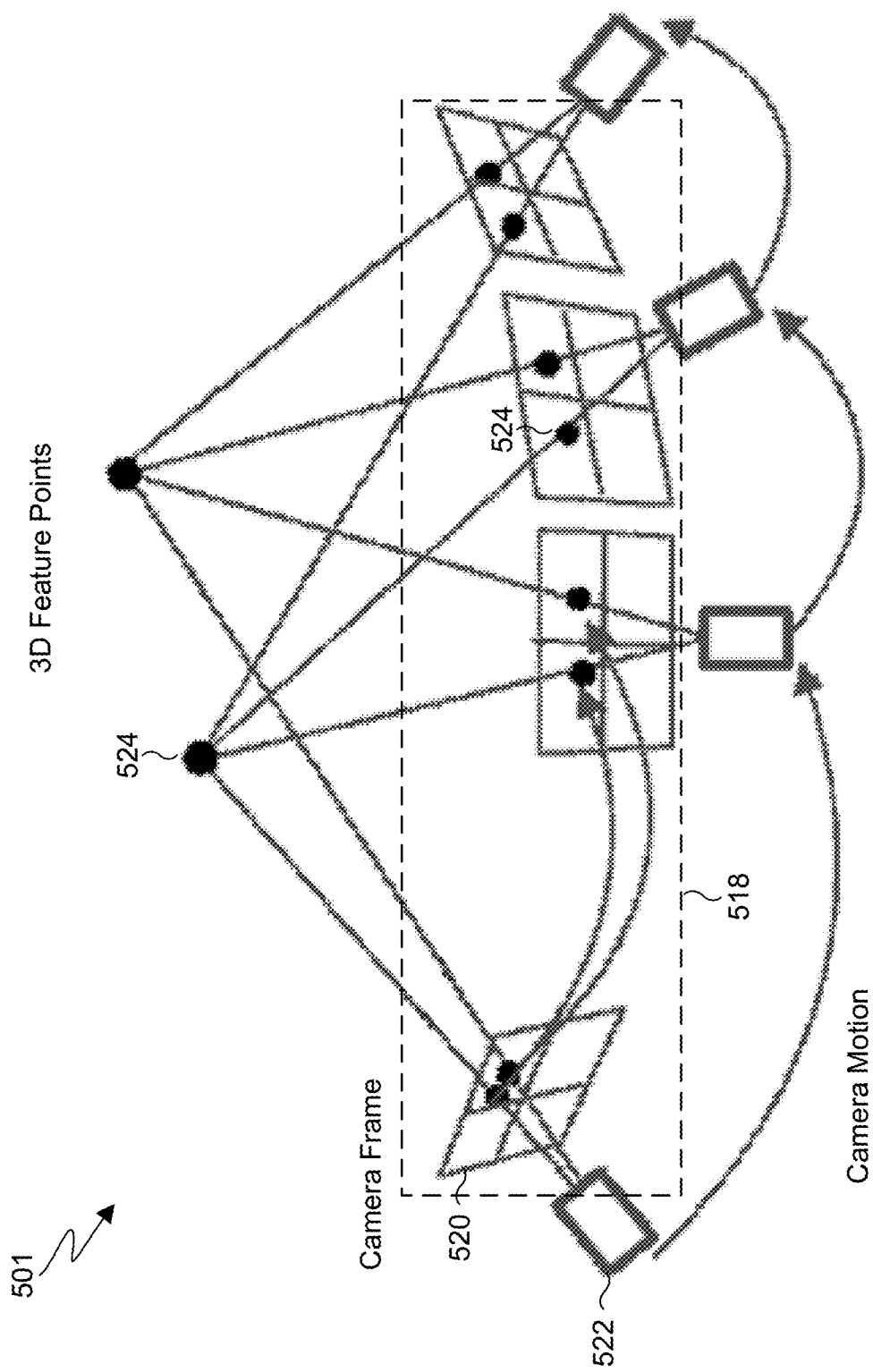

FIGS. 5A and 5B illustrate an example process 500 for pose optimization and keyframe selection in accordance with this disclosure. In particular, FIG. 5A illustrates an example flowchart for a process 500 of operations 502-516, and FIG. 5B illustrates an example diagram 501 for the process 500. For ease of explanation, the process 500 may be described as being implemented using the electronic device 101 in the network configuration 100 of FIG. 1. However, the process 500 may be used in any other suitable device(s) and in any other suitable system(s).

As shown in FIGS. 5A and 5B, the electronic device 101 can capture an image sequence 518 in operation 502. The image sequence 518 can be a series of images 520 captured as a camera 522 is moving in relation to a scene. The image sequence 518 can also be captured using multiple cameras, such as the first and second cameras 222 and 224. The electronic device 101 can capture a camera pose in operation 504. The camera pose can be captured along with each image 520 in the image sequence 518. The camera pose can be captured using an IMU position sensor 226 that performs a position data capture operation, such as the data capture operation 236, in order to generate position data related to the image sequence 518. The position data can identify a position and an orientation of the electronic device 101.

The electronic device 101 can perform feature extraction using a CNN in operation 506. The feature extraction can identify 3D feature points 524 in a scene. For example, the images 520 can be input to the CNN, and the CNN can identify the points in each of the images as 3D feature points 524. The 3D feature points 524 can be used in a feature map for an image frame. The electronic device 101 can perform feature matching using a CNN in operation 508. For example, each of the 3D feature points 524 can be visible in one or more of the images 520. In some embodiments, 3D feature points 524 can be distinguishable points in at least two images 520. The feature matching can be performed on neighboring frames to obtain image correspondence, where neighboring frames can be determined based on proximity or temporally.

The electronic device 101 can perform keyframe selection in operation 510. Based on the image correspondence, images can be determined to be keyframes based on their representations of the 3D scene. For example, the image correspondence can be assigned a value, and that value can be compared to a threshold or predetermined percentage of selected images. As a particular example, when ten percent of one hundred images are to be selected as keyframes, the electronic device 101 can identify the ten images with a highest image correspondence values. An initial 3D structure can be generated by the electronic device 101 using the camera poses and the keyframes in operation 512. Depths and positions of the 3D feature points 524 can be determined from the selected keyframes 405. The electronic device 101 can use the camera pose(s) corresponding to the selected keyframes to analyze the feature points 524 in each of the selected keyframes. The feature points 524 in a first selected keyframe can be compared with the feature points 524 in a second selected keyframe to identify a position of the 3D feature point 524 in a scene.

The electronic device 101 can perform global bundle adjustment on the 3D feature points 524 in operation 514. The global bundle adjustment can refine the coordinates of the 3D feature points 524 in the scene from the keyframes captured at different viewpoints. Scene geometry can be optimized using the camera pose information and the optical characteristics of the camera. The electronic device 101 can determine optimized keyframes and camera poses for the keyframes in operation 516. The optimized keyframes and camera poses can be determined for each 3D feature point, and the optimized keyframe and camera poses efficiently represent a 3D structure in a capture scene.

Although FIGS. 5A and 5B illustrate one example of a process 500 for pose optimization and keyframe selection, various changes may be made to FIGS. 5A and 5B. For example, the process 500 for pose optimization and keyframe selection may be implemented on a different electronic device, such as a headset, a camera, etc.

Figure 6:
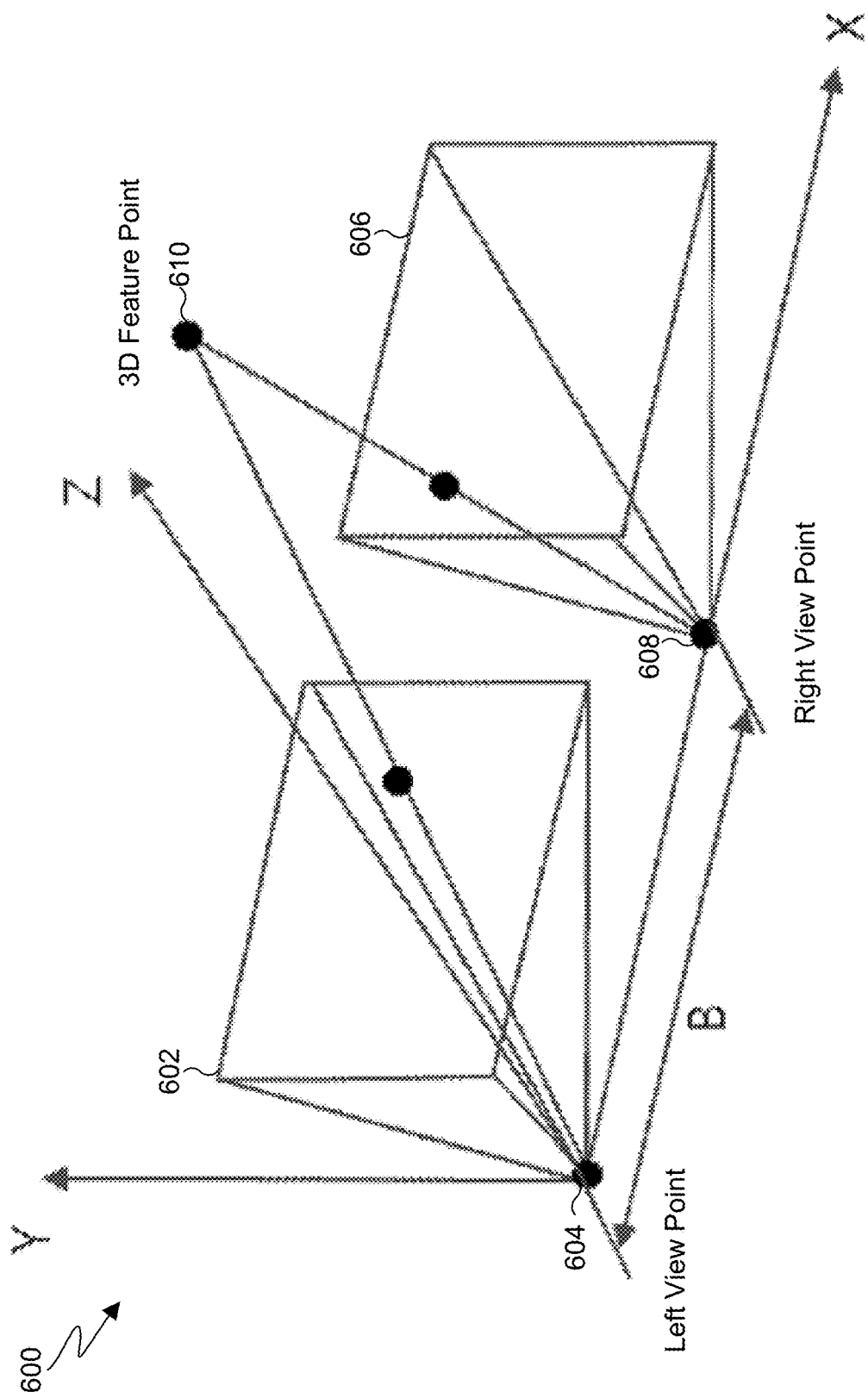
FIG. 6 illustrates an example depth computation from binocular stereo vision in accordance with this disclosure.

FIG. 6 illustrates an example depth computation 600 from binocular stereo vision in accordance with this disclosure. The depth computation 600 here represents an example of how the depth verifying and de-noising operation 248 shown in FIG. 2B may be performed. For ease of explanation, the depth computation 600 may be described as being implemented using the electronic device 101 in the network configuration 100 of FIG. 1. However, the depth computation 600 shown in FIG. 6 could be used with any other suitable device(s) and in any other suitable system(s).

As shown in FIG. 6, the depth computation 600 can be performed between a first image 602 captured at a first viewpoint 604 and a second image 606 captured at a second viewpoint 608. Depths to feature points 610 can be computed with image pairs from a stereo camera pair, such as left and right cameras on an AR headset. Dense depth maps can be obtained from the image 602 and 606. Only computing the depths and depth maps for keyframes can reduce computational loads and increase performance of the electronic device 101, such as an AR headset.

Although FIG. 6 illustrates one example of a depth computation 600 from binocular stereo vision, various changes may be made to FIG. 6. For example, the depth computation 600 may be implemented on a different electronic device, such as a headset, a camera, etc.

Figure 7:
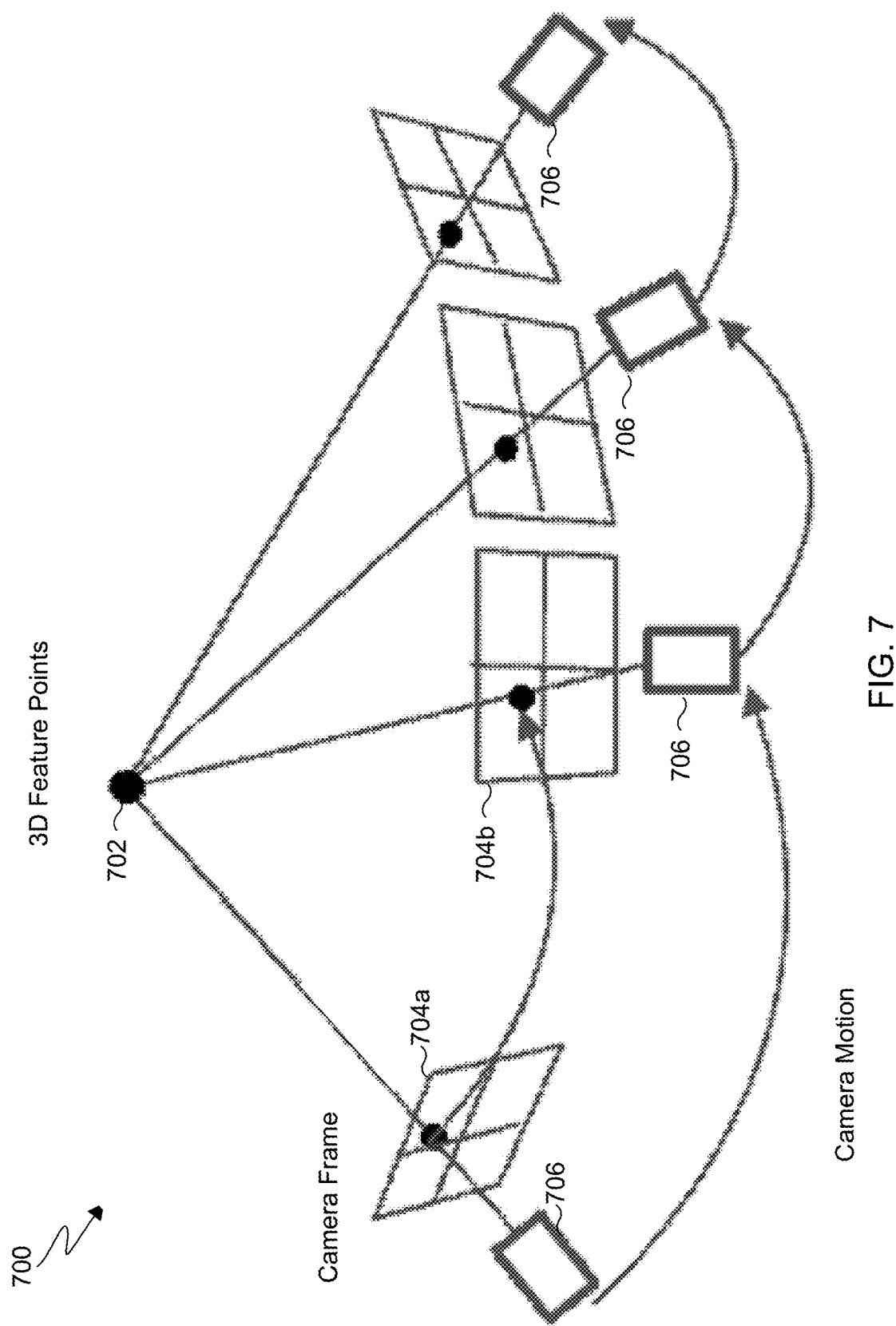
FIG. 7 illustrates an example diagram for depth verification and noise reduction with structure from motion (SFM) in accordance with this disclosure.

FIG. 7 illustrates an example diagram 700 for depth verification and noise reduction with SFM in accordance with this disclosure. For ease of explanation, the depth verification and noise reduction may be described as being implemented using the electronic device 101 in the network configuration 100 of FIG. 1. However, the depth verification and noise reduction shown in FIG. 7 could be used with any other suitable device(s) and in any other suitable system(s).

As shown in FIG. 7, using the depths reconstructed from the image pairs in FIG. 6, a depth verification to a 3D feature point 702 can be performed. The depth verification uses a relationship of triangulation in two keyframes 704a and 704b of one camera 706 and the feature point 702. A reconstructed 3D feature point 702 is correct if the two relationships are satisfied at the same time for the specified 3D feature point 702. When at least one of the relationships is not satisfied, the depth is wrong or noise exists. Depths that do not satisfy the relationships can be removed, which also reduces noise in the rendering of the scene.

Although FIG. 7 illustrates one example of a diagram 700 for depth verification and noise reduction with SFM, various changes may be made to FIG. 7. For example, the example depth verification and noise reduction may be implemented on a different electronic device, such as a headset, a camera, etc.

Figure 8:
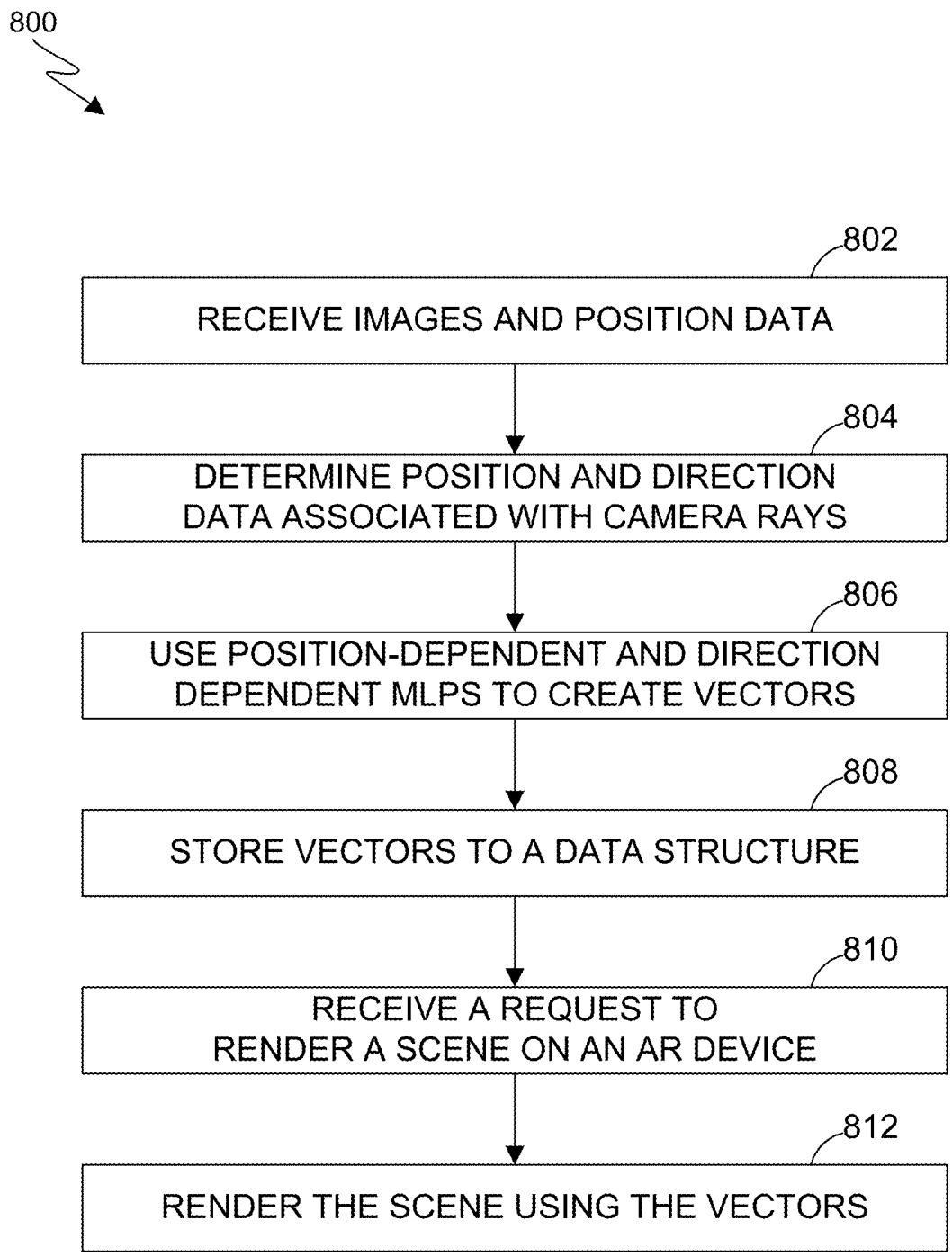
FIG. 8 illustrates an example method for real-time photorealistic view rendering on an AR device according to this disclosure.

FIG. 8 illustrates an example method 800 for real-time photorealistic view rendering on an AR device according to this disclosure. For ease of explanation, the method 800 of FIG. 8 is described as being performed using the electronic device 101 in the network configuration 100 of FIG. 1. However, the method 800 may be used with any other suitable device(s) and in any other suitable system(s).

As shown in FIG. 8, the electronic device 101 can receive images and position data at step 802. For example, the electronic device 101 can receive images of a scene and corresponding position data of a device that captures the images. In some cases, the images and position data can be received directly from the imaging sensors and the IMU sensor or received from a storage on the electronic device 101.

The electronic device 101 can determine position and direction data associated with camera rays at step 804. For instance, the electronic device 101 may determine position data and direction data associated with camera rays passing through keyframes. The keyframes can be frames identified from the images of the scene that best represent the scene, and the keyframes can be identified by performing feature matching between neighboring images. The keyframes are a subset of the images captured by the cameras. Additionally, redundant images that are detected during the feature matching can be removed. The electronic device 101 can identify camera rays passing through the keyframes and an optimal camera pose, where the optimal camera pose can be used to determine the direction data associated with the camera ray. In some embodiments, the electronic device 101 can determine first and second types of depth information for the keyframes. The first type of depth information for the keyframes can be determined using stereo pairs of the keyframes. The second type of depth information for the keyframes can be determined using SFM. The first and second types of depth information can be compared to create a depth map for the keyframes, and the depth map can be used to determine the position data associated with the camera ray.

The electronic device 101 can use position-dependent and direction dependent MLPs to create vectors at step 806. For example, the electronic device 101 can use a position-dependent MLP and a direction-dependent MLP to create sparse feature vectors. The position-dependent MLP can be trained to receive the position data associated with camera rays and output a deep radiance map and densities. The direction-dependent MLP can be trained to receive the direction data associated with the camera rays and output pixel weights for the deep radiance map.

The electronic device 101 can store the sparse feature vectors in a data structure at step 808. For example, the deep radiance map can be stored in a sparse feature grid and cached in a feature lookup table. The 3D scene reconstruction can be stored in a sparse grid of feature vectors in an octree data structure. The feature lookup table can identify specific features in the data structure. The electronic device 101 can receive a request to render a scene on an AR device associated with a viewing direction at step 810. For example, the request can be received based on a user opening an application on the electronic device 101, such as an AR headset. The request can also be based on a user selecting a specific 3D video or environment to explore. The electronic device 101 can render the scene using the vectors in step 812. For example, the rendering of the scene associated with the viewing direction can use the sparse feature vectors in the at least one data structure. The scene associated with the viewing direction can be rendered by querying the sparse feature grid and the feature lookup table.

Although FIG. 8 illustrates one example of a method 800 for real-time photorealistic view rendering on an AR device, various changes may be made to FIG. 8. For example, while shown as a series of steps, various steps in FIG. 8 may overlap, occur in parallel, occur in a different order, or occur any number of times.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
   obtaining images of a scene and corresponding position data of a device that captures the images;
   determining position data and direction data associated with camera rays passing through keyframes of the images;
   using a position-dependent multilayer perceptron (MLP) and a direction-dependent MLP to create sparse feature vectors;
   storing the sparse feature vectors in a sparse feature grid and a feature lookup table separate and distinct from the sparse feature grid;
   receiving a request to render the scene on an augmented reality (AR) device associated with a viewing direction; and
   rendering the scene associated with the viewing direction by querying in parallel the sparse feature grid and the feature lookup table.

2. The method of claim 1, wherein determining the position data and the direction data associated with the camera rays comprises:
   identifying the keyframes from the images of the scene that best represent the scene by performing feature matching between neighboring images;
   removing redundant images detected during the feature matching between the neighboring images;
   identifying the camera rays passing through the keyframes and an optimal camera pose; and
   using the optimal camera pose to determine the direction data associated with the camera rays.

3. The method of claim 2, further comprising:
   determining a first type of depth information for the keyframes using stereo image pairs of the keyframes;
   determining a second type of depth information for the keyframes using structure from motion (SFM);
   using a comparison of the first type of depth information and the second type of depth information to create a depth map for the keyframes; and
   using the depth map to determine the position data associated with the camera rays.

4. The method of claim 1, wherein the position-dependent MLP is trained to receive the position data associated with the camera rays and output a deep radiance map and a density.

5. The method of claim 4, wherein storing the sparse feature vectors comprises storing the deep radiance map in the sparse feature grid and caching the deep radiance map in the feature lookup table.

6. The method of claim 1, wherein the direction-dependent MLP is trained to receive the direction data associated with the camera rays and output pixel weights.

7. An electronic device comprising:
   at least one processing device configured to:
   obtain images of a scene and corresponding position data of a device that captures the images;
   determine position data and direction data associated with camera rays passing through keyframes of the images;
   use a position-dependent multilayer perceptron (MLP) and a direction-dependent MLP to create sparse feature vectors;
   store the sparse feature vectors in a sparse feature grid and a feature lookup table separate and distinct from the sparse feature grid;
   receive a request to render the scene on an augmented reality (AR) device associated with a viewing direction; and
   render the scene associated with the viewing direction by querying in parallel the sparse feature grid and the feature lookup table.

8. The electronic device of claim 7, wherein, to determine the position data and the direction data associated with the camera rays, the at least one processing device is configured to:
   identify the keyframes from the images of the scene that best represent the scene by performing feature matching between neighboring images;
   remove redundant images detected during the feature matching between the neighboring images;
   identify the camera rays passing through the keyframes and an optimal camera pose; and
   use the optimal camera pose to determine the direction data associated with the camera rays.

9. The electronic device of claim 8, wherein the at least one processing device is further configured to:
   determine a first type of depth information for the keyframes using stereo image pairs of the keyframes;
   determine a second type of depth information for the keyframes using structure from motion (SFM);
   use a comparison of the first type of depth information and the second type of depth information to create a depth map for the keyframes; and
   use the depth map to determine the position data associated with the camera rays.

10. The electronic device of claim 7, wherein the position-dependent MLP is trained to receive the position data associated with the camera rays and output a deep radiance map and a density.

11. The electronic device of claim 10, wherein, to store the sparse feature vectors, the at least one processing device is configured to store the deep radiance map in the sparse feature grid and caching the deep radiance map in the feature lookup table.

12. The electronic device of claim 7, wherein the direction-dependent MLP is trained to receive the direction data associated with the camera rays and output pixel weights.

13. A non-transitory machine readable medium containing instructions that when executed cause at least one processor of an electronic device to:
  receive images of a scene and corresponding position data of a device that captures the images;
  determine position data and direction data associated with camera rays passing through keyframes of the images;
  use a position-dependent multilayer perceptron (MLP) and a direction-dependent MLP to create sparse feature vectors;
  store the sparse feature vectors in a sparse feature grid and a feature lookup table separate and distinct from the sparse feature grid;
  receive a request to render the scene on an augmented reality (AR) device associated with a viewing direction; and
  render the scene associated with the viewing direction by querying in parallel the sparse feature grid and the feature lookup table.

14. The non-transitory machine readable medium of claim 13, wherein the instructions that when executed cause the at least one processor to determine the position data and the direction data associated with the camera rays comprise:
  instructions that when executed cause the at least one processor to:
    identify the keyframes from the images of the scene that best represent the scene by performing feature matching between neighboring images;
    remove redundant images detected during the feature matching between the neighboring images;
    identify the camera rays passing through the keyframes and an optimal camera pose; and
    use the optimal camera pose to determine the direction data associated with the camera rays.

15. The non-transitory machine readable medium of claim 14, further containing instructions that when executed cause the at least one processor to:
  determine a first type of depth information for the keyframes using stereo image pairs of the keyframes;
  determine a second type of depth information for the keyframes using structure from motion (SFM);
  use a comparison of the first type of depth information and the second type of depth information to create a depth map for the keyframes; and
  use the depth map to determine the position data associated with the camera rays.

16. The non-transitory machine readable medium of claim 13, wherein the position-dependent MLP is trained to receive the position data associated with the camera rays and output a deep radiance map and a density.

17. The non-transitory machine readable medium of claim 16, wherein the instructions that when executed cause the at least one processor to store the sparse feature vectors comprise:
  instructions that when executed cause the at least one processor to store the deep radiance map in the sparse feature grid and caching the deep radiance map in the feature lookup table.

18. The non-transitory machine readable medium of claim 13, wherein the direction-dependent MLP is trained to receive the direction data associated with the camera rays and output pixel weights.

19. The method of claim 1, wherein determining the position data and the direction data associated with the camera rays comprises:
  determining a first type of depth information for the keyframes using stereo image pairs of the keyframes;
  determining a second type of depth information for the keyframes using structure from motion (SFM);
  verifying the first type of depth information using relationships of a triangulation in two keyframes of the keyframes;
  using a comparison of the first type of depth information and the second type of depth information to create a depth map for the keyframes; and
  using the depth map to determine the position data associated with the camera rays.

20. The electronic device of claim 7, wherein, to determine the position data and the direction data associated with the camera rays, the at least one processing device is configured to:
  determine a first type of depth information for the keyframes using stereo image pairs of the keyframes;
  determine a second type of depth information for the keyframes using structure from motion (SFM);
  verify the first type of depth information using relationships of a triangulation in two keyframes of the keyframes;
  use a comparison of the first type of depth information and the second type of depth information to create a depth map for the keyframes; and
  use the depth map to determine the position data associated with the camera rays.

* * * * *